United States Patent
Nakayama et al.

(10) Patent No.: US 11,145,881 B2
(45) Date of Patent: Oct. 12, 2021

(54) GAS FLOW PASSAGE FORMATION PLATE FOR FUEL CELL AND FUEL CELL STACK

(71) Applicant: TOYOTA SHATAI KABUSHIKI KAISHA, Kariya (JP)

(72) Inventors: Hirotaka Nakayama, Kariya (JP); Yoshinori Shinozaki, Kariya (JP); Satoshi Futami, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 237 days.

(21) Appl. No.: 16/138,803

(22) Filed: Sep. 21, 2018

(65) Prior Publication Data

US 2019/0103617 A1  Apr. 4, 2019

(30) Foreign Application Priority Data

Oct. 4, 2017  (JP) .............................. JP2017-194382

(51) Int. Cl.
*H01M 8/04291* (2016.01)
*H01M 8/04119* (2016.01)
*H01M 8/0258* (2016.01)

(52) U.S. Cl.
CPC ..... *H01M 8/04291* (2013.01); *H01M 8/0258* (2013.01); *H01M 8/04156* (2013.01)

(58) Field of Classification Search
CPC ......... H01M 8/04291; H01M 8/04156; H01M 8/0258
See application file for complete search history.

(56) References Cited

U.S. PATENT DOCUMENTS

| 2011/0159399 A1* | 6/2011 | Kondo | H01M 8/023 429/480 |
| 2011/0244369 A1* | 10/2011 | Kondo | H01M 8/0258 429/513 |
| 2012/0028139 A1* | 2/2012 | Kawajiri | H01M 4/926 429/414 |

(Continued)

FOREIGN PATENT DOCUMENTS

| JP | 2011-48980 A | 3/2011 |
| JP | 2014-167860 A | 9/2014 |
| WO | 2010/113534 A1 | 10/2010 |

OTHER PUBLICATIONS

JP Office Action in Application No. 2017-194382 dated Nov. 20, 2020.

*Primary Examiner* — Bethany L Martin
(74) *Attorney, Agent, or Firm* — Maschoff Brennan

(57) ABSTRACT

A gas flow passage formation plate includes a plurality of projections arranged in a first direction and a second direction. The projections project toward a membrane electrode assembly. The gas flow passage formation plate further includes a gas flow passage, a water flow passage, and a plurality of openings. The gas flow passage is formed by a portion of the gas flow passage formation plate at a side opposing the membrane electrode assembly including regions between two adjacent projections. The water flow passage is formed by a portion of the gas flow passage formation plate at a side opposing a partition plate including the inside of the projections. The openings are each formed in a side wall of the projection connecting inside and outside of the projection. Each opening is arranged at only one location in one projection.

6 Claims, 7 Drawing Sheets

(56) References Cited

U.S. PATENT DOCUMENTS

| | | | |
|---|---|---|---|
| 2015/0221958 A1 | 8/2015 | Hashimoto et al. | |
| 2015/0236368 A1* | 8/2015 | Hashimoto | H01M 8/242 |
| | | | 429/465 |
| 2015/0263357 A1* | 9/2015 | Morozumi | H01M 8/021 |
| | | | 429/514 |
| 2015/0333357 A1* | 11/2015 | Hashimoto | H01M 8/04089 |
| | | | 429/458 |
| 2016/0043412 A1* | 2/2016 | Hashimoto | H01M 8/04156 |
| | | | 429/482 |
| 2017/0054156 A1* | 2/2017 | Kawajiri | H01M 8/026 |
| 2017/0141410 A1* | 5/2017 | Ikeda | H01M 8/0265 |
| 2017/0317358 A1* | 11/2017 | Shinozaki | H01M 8/04156 |
| 2017/0331123 A1* | 11/2017 | Nakaji | H01M 8/0258 |
| 2018/0069248 A1* | 3/2018 | Suzuki | B30B 15/02 |
| 2018/0097243 A1* | 4/2018 | Suzuki | H01M 8/0213 |

\* cited by examiner

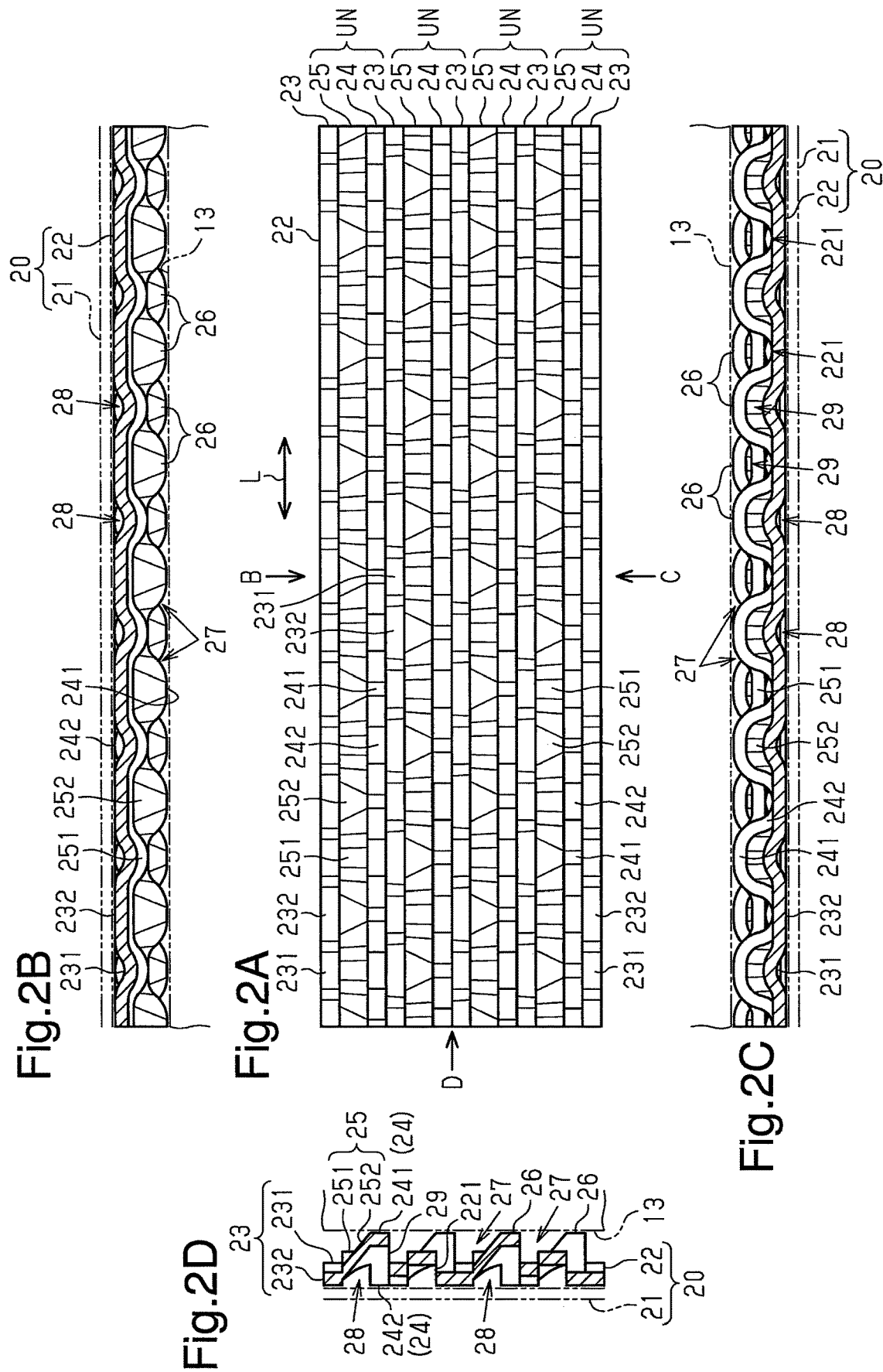

GAS FLOW PASSAGE FORMATION PLATE FOR FUEL CELL AND FUEL CELL STACK

BACKGROUND ART

The present invention relates to a gas flow passage formation plate for a fuel cell that is located between a membrane electrode assembly and a partition plate and is included in a separator of cells of the fuel cell, and a fuel cell stack formed by stacking a plurality of cells.

A known solid polymer fuel cell includes a fuel cell stack formed by stacking a plurality of cells. A cell is configured by sandwiching a membrane electrode assembly between two separators. Japanese Laid-Open Patent Publication No. 2011-48980 discloses an example of a separator that includes a flat partition plate and a gas flow passage formation plate, which is located between the partition plate and the membrane electrode assembly.

In the publication, the gas flow passage formation plate includes a plurality of projections that are arranged in a regular manner. The projections project toward the membrane electrode assembly. The portion of the gas flow passage formation plate at the side opposing the membrane electrode assembly (including parts between adjacent projections) functions as a gas flow passage. The gas flow passage circulate the gas (fuel gas and oxidant gas) supplied into the cell. The portion of the gas flow passage formation plate at the side opposing the partition plate (including inside of projections) functions as a water flow passage. The water flow passage discharges water, which is produced in the cell during power generation, from the cell. Each projection of the gas flow passage formation plate includes two openings that connect the inside (water flow passage) and the outside (gas flow passage) of the projection. The two openings are located at opposite sides of the tip of the projection.

In such a fuel cell stack, the water produced in the membrane electrode assembly during power generation flows into the water flow passage through the openings in the gas flow passage formation plate. The flow pressure of the gas flowing in the water flow passage forces the water out of the water flow passage.

The above fuel cell stack generates a pressure difference between the two sides of each projection in the gas flow passage. Thus, some of the gas in the gas flow passage flows from one side of the projection via the tip of the projection toward the other side. This diffuses the gas in the gas flow passage toward the membrane electrode assembly.

In the above gas flow passage formation plate, the two openings are located at opposite sides of the tip of each projection. Accordingly, even when there is a pressure difference between the two sides of the projection, the gas may flow through the inside of the projection via the openings without flowing toward the tip of the projection. In this case, the gas would not be sufficiently diffused toward the membrane electrode assembly. Thus, power generation efficiency of the fuel cell stack cannot be improved.

Accordingly, one object of the present invention is to provide a gas flow passage formation plate for a fuel cell and a fuel cell stack that sufficiently diffuse the gas in the gas flow passage.

SUMMARY OF THE INVENTION

A gas flow passage formation plate for a fuel cell that achieves the above object is located between a membrane electrode assembly and a partition plate and is included in a separator of a cell in a fuel cell. The gas flow passage formation plate includes a plurality of projections, a gas flow passage, a water flow passage, and a plurality of openings. The projections are arranged in a first direction and a second direction that is orthogonal to the first direction. The projections project toward the membrane electrode assembly. The gas flow passage is formed by a portion of the gas flow passage formation plate at a side opposing the membrane electrode assembly including regions between adjacent projections. The water flow passage is formed by a portion of the gas flow passage formation plate at a side opposing the partition plate including the inside of each of the projections. The openings are each formed in a side wall of one of the projections connecting the inside and the outside of the projection. Each of the openings is arranged at only one location in one of the projections.

A gas flow passage formation plate for a fuel cell that achieves the above object is located between a membrane electrode assembly and a partition plate and is included in a separator of a cell in a fuel cell. The gas flow passage formation plate includes a plurality of protrusions, a gas flow passage, a water flow passage, and a plurality of openings. The protrusions are located at intervals. The protrusions are projected toward the membrane electrode assembly. The gas flow passage is formed by a portion of the gas flow passage formation plate at a side opposing the membrane electrode assembly including regions between adjacent protrusions. The water flow passage is formed by a portion of the gas flow passage formation plate at a side opposing the partition plate including the inside of each of the protrusions. The openings are each formed in a side wall of one of the protrusions connecting the inside and the outside of the protrusion. The openings are located at intervals in a direction in which the protrusions extend.

A fuel cell stack that achieves the above object is formed by stacking a plurality of cells. Each of the cells includes a membrane electrode assembly and a pair of separators that sandwich the membrane electrode assembly. At least one of the two separators includes a partition plate and the above gas flow passage formation plate located between the partition plate and the membrane electrode assembly.

BRIEF DESCRIPTION OF THE DRAWINGS

The invention, together with objects and advantages thereof, may best be understood by reference to the following description of the presently preferred embodiments together with the accompanying drawings in which:

FIG. 2A is a plan view of the gas flow passage formation plate;

FIG. 2B is a view taken in the direction of arrow B in FIG. 2A;

FIG. 2C is a view taken in the direction of arrow C in FIG. 2A;

FIG. 2D is a view taken in the direction of arrow D in FIG. 2A;

EMBODIMENTS OF THE INVENTION

A gas flow passage formation plate and a fuel cell stack in accordance with one embodiment will now be described.

Figure 1:
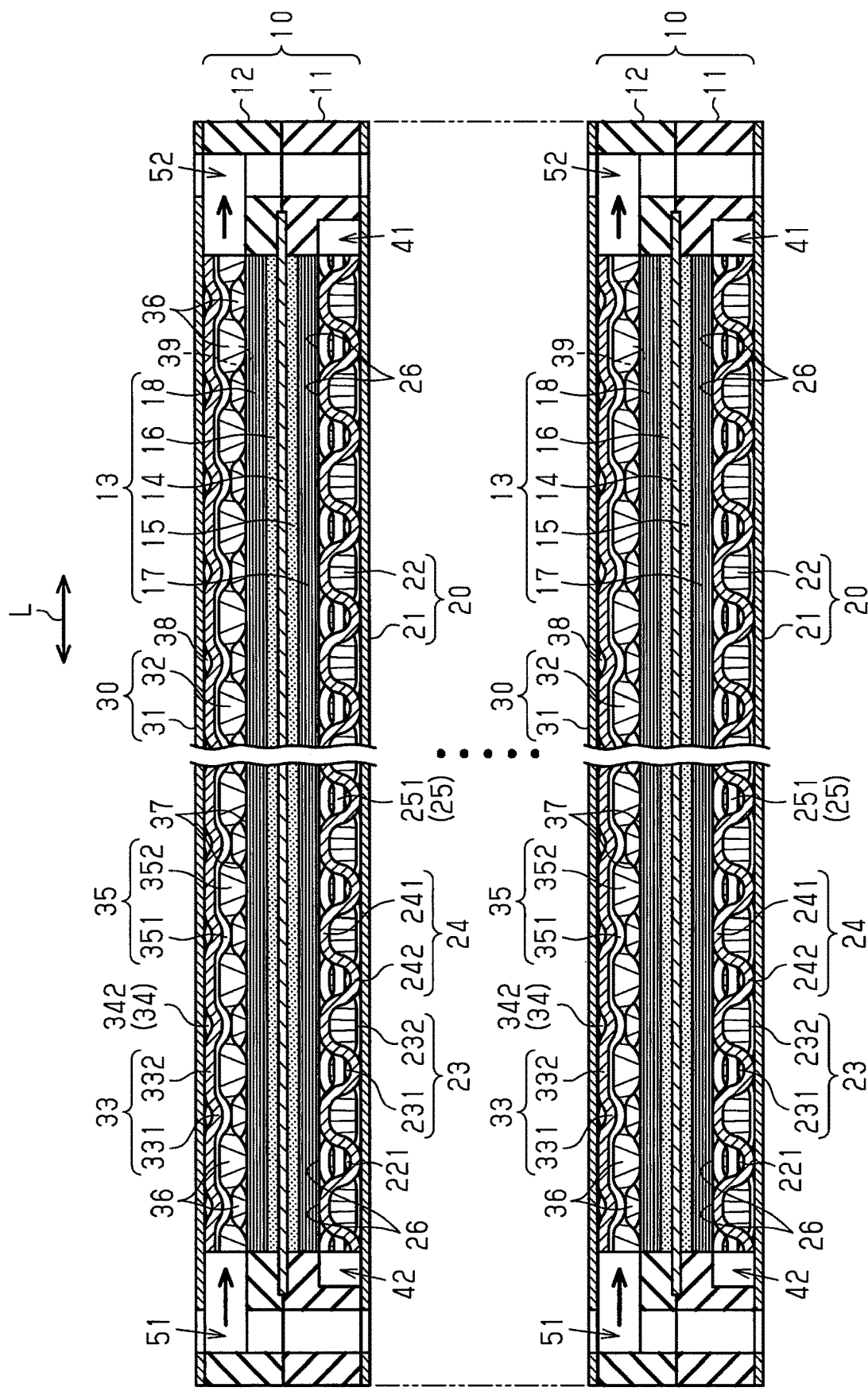
FIG. 1 is a cross-sectional view showing one embodiment of a gas flow passage formation plate and a fuel cell stack.

As shown in FIG. 1, the fuel cell stack in the present embodiment is formed by stacking a plurality of cells 10. The fuel cell stack is incorporated in a solid polymer fuel cell. The cell 10 includes a square first frame 11 and a square second frame 12. The frames 11 and 12 sandwich an outer edge of a known membrane electrode assembly 13 that has the form of a square sheet. The membrane electrode assembly 13 has multiple layers including a solid polymer electrolyte membrane 14, a pair of electrode catalyst layers 15 and 16, and a pair of gas diffusion layers 17 and 18. The solid polymer electrolyte membrane 14 is held between the two electrode catalyst layers 15 and 16. The two gas diffusion layers 17 and 18 respectively cover outer surfaces of the electrode catalyst layers 15 and 16.

The membrane electrode assembly 13 is held between a first separator 20 and a second separator 30. The first separator 20 contacts the gas diffusion layer 17 at a cathode side (lower side as viewed in FIG. 1) of the membrane electrode assembly 13. The first separator 20 includes a flat separator 21 that has the form of a flat plate and a gas flow passage formation plate 22. The gas flow passage formation plate 22 is located between the flat separator 21 and the membrane electrode assembly 13. The second separator 30 contacts the gas diffusion layer 18 at an anode side (upper side as viewed in FIG. 1) of the membrane electrode assembly 13. The second separator 30 includes a flat separator 31 that has the form of a flat plate and a gas flow passage formation plate 32. The gas flow passage formation plate 32 is located between the flat separator 31 and the membrane electrode assembly 13. The flat separators 21 and 31 and the gas flow passage formation plates 22 and 32 are formed from a metal plate. In the present embodiment, the flat separators 21 and 31 correspond to partition plates.

Inside the cell 10, a supply passage 41 and a discharge passage 42 are defined by the first frame 11 and the flat separator 21. The supply passage 41 supplies oxidant gas to a gas flow passage 27 from an oxidant gas supply source (not shown). The discharge passage 42 discharges the oxidant gas that has not been used for power generation out of the gas flow passage 27.

Further, inside the cell 10, a supply passage 51 and a discharge passage 52 are defined by the second frame 12 and the flat separator 31. The supply passage 51 supplies fuel gas to a gas flow passage 37 from a fuel gas supply source (not shown). The discharge passage 52 discharges the fuel gas that has not been used for power generation out of the gas flow passage 37.

In FIG. 1, the gas flow passage formation plate 32 of the second separator 30 has a form obtained by vertically and horizontally reversing the gas flow passage formation plate 22 of the first separator 20. Thus, while the gas flow passage formation plate 22 of the first separator 20 will be described in detail, reference numerals "3*" obtained by adding "10" to the reference numerals "2*" of the components of the gas flow passage formation plate 22 of the first separator 20 and reference numerals "3" obtained by adding "100" to the reference numerals "2" of the components of the gas flow passage formation plate 22 of the first separator 20 are assigned to the corresponding components of the gas flow passage formation plate 32 of the second separator 30, and redundant explanations are omitted.

The structure of the gas flow passage formation plate 22 will now be described.

As shown in FIGS. 2A, 2B, 2C, and 2D, the gas flow passage formation plate 22 is formed by roll forming a metal plate such as a stainless steel plate.

The gas flow passage formation plate 22 is formed by arranging three substantially wave-shaped plate portions of different forms (small wave portion 23, large wave portion 24, and middle wave portion 25) in a cyclic manner. The structure in which the small wave portion 23, the large wave portion 24, and the middle wave portion 25 are arranged in this order will be referred to as a unit structure UN. The gas flow passage formation plate 22 includes a plurality of the unit structures UN. Among the three substantially wave-shaped plate portions, the small wave portion 23 has a waveform with the smallest amplitude. The large wave portion 24 has a waveform with the largest amplitude, and the middle wave portion 25 has a waveform with a middle amplitude.

The small wave portion 23 includes parts (projected parts 231) that project toward the membrane electrode assembly 13 and parts (recessed parts 232) that are recessed relative to the membrane electrode assembly 13. Each projected part 231 extends at a location spaced apart from the flat separator 21. Each recessed part 232 includes a surface that opposes and contacts the flat separator 21.

The large wave portion 24 includes parts (projected parts 241) that project toward the membrane electrode assembly 13 and parts (recessed parts 242) that are recessed relative to the membrane electrode assembly 13. Each projected part 241 includes an end surface that contacts the membrane electrode assembly 13. Each recessed part 242 includes a surface that opposes and contacts the flat separator 21.

The middle wave portion 25 is inclined farther away from the membrane electrode assembly 13 as the middle wave portion 25 becomes farther from the large wave portion 24.

In an extension direction L, in which the waveform of the middle wave portion 25 extends, the middle wave portion 25 is formed by gradually inclined parts 251 and steeply inclined parts 252 that are alternately arranged. Each gradually inclined part 251 has a small inclination. Each steeply inclined part 252 has a large inclination. The location of each steeply inclined part 252 of the middle wave portion 25 in the extension direction L coincides with the location of each projected part 241 of the large wave portion 24. Further, the location of each gradually inclined part 251 of the middle wave portion 25 in the extension direction L coincides with the location of each recessed part 242 of the large wave portion 24.

The middle wave portion 25 includes an end opposing the large wave portion 24. Along the end, each steeply inclined part 252 forms a projection that projects toward the membrane electrode assembly 13, and each gradually inclined part 251 forms a recess that is recessed relative to the membrane electrode assembly 13. Along the end of the middle wave portion 25 opposing the large wave portion 24, each projection includes an end that opposes and contacts the membrane electrode assembly 13. Further, along the end of the middle wave portion 25 opposing the large wave portion 24, each recess includes an end that opposes the flat separator 21 and extends between the flat separator 21 and the membrane electrode assembly 13.

The middle wave portion 25 includes an end spaced apart from the large wave portion 24. Along the end, each steeply inclined part 252 forms a recess that is recessed relative to the membrane electrode assembly 13, and each gradually inclined part 251 forms a projection that projects toward the membrane electrode assembly 13. Along the end of the middle wave portion 25 spaced apart from the large wave portion 24, the projections (gradually inclined parts 251) and the recesses (steeply inclined parts 252) both extend between the flat separator 21 and the membrane electrode assembly 13 (specifically, at locations spaced apart from flat separator 21).

The small wave portion 23 is located next to the end of the middle wave portion 25 spaced apart from the large wave portion 24. The end of the middle wave portion 25 spaced apart from the large wave portion 24 (that is, end opposing small wave portion 23) extends at a location that is closer to the membrane electrode assembly 13 than the small wave portion 23. Along the end of the middle wave portion 25 spaced apart from the large wave portion 24, the location of each projection of the middle wave portion 25 in the extension direction L coincides with the location of each projected part 231 of the small wave portion 23. Further, the location of each recess of the middle wave portion 25 in the extension direction L coincides with the location of each recessed part 232 of the small wave portion 23.

As shown in FIGS. 3A, 3B, 4A, and 4B, the gas flow passage formation plate 22 includes dome-shaped projections 26 that project toward the membrane electrode assembly 13. Each projection 26 is formed by the projected part 241 of the large wave portion 24 and the steeply inclined part 252 of the middle wave portion 25.

On the gas flow passage formation plate 22, two adjacent unit structures UN (refer to FIG. 2) are arranged so that the projections 26 are alternately located in the extension direction L. More specifically, in a direction that is orthogonal to the extension direction L, two adjacent unit structures UN are arranged so that each projection 26 of one unit structure UN is aligned with a part located between two adjacent projections 26 of the other unit structure UN. In this manner, the projections 26 are arranged at equal intervals both in the extension direction L, which is a first direction, and in a second direction that orthogonally intersects the first direction (direction of double-headed arrow CR in FIGS. 3 and 4).

The side of the gas flow passage formation plate 22 opposing the membrane electrode assembly 13 includes the groove-like gas flow passage 27 formed between adjacent projections 26. More specifically, the gas flow passage 27 is defined by side walls of adjacent projections 26 (projected parts 241 of large wave portion 24 and steeply inclined parts 252 of middle wave portion 25) and parts that connect adjacent projections 26 (recessed parts 242 of the large wave portion 24, gradually inclined parts 251 of middle wave portion 25, and small wave portion 23). The gas flow passage 27 extends in a substantially grid-shaped pattern at the side of the gas flow passage formation plate 22 opposing the membrane electrode assembly 13. The gas flow passage 27 mainly functions as a passage that circulates oxidant gas.

Figure 4A:
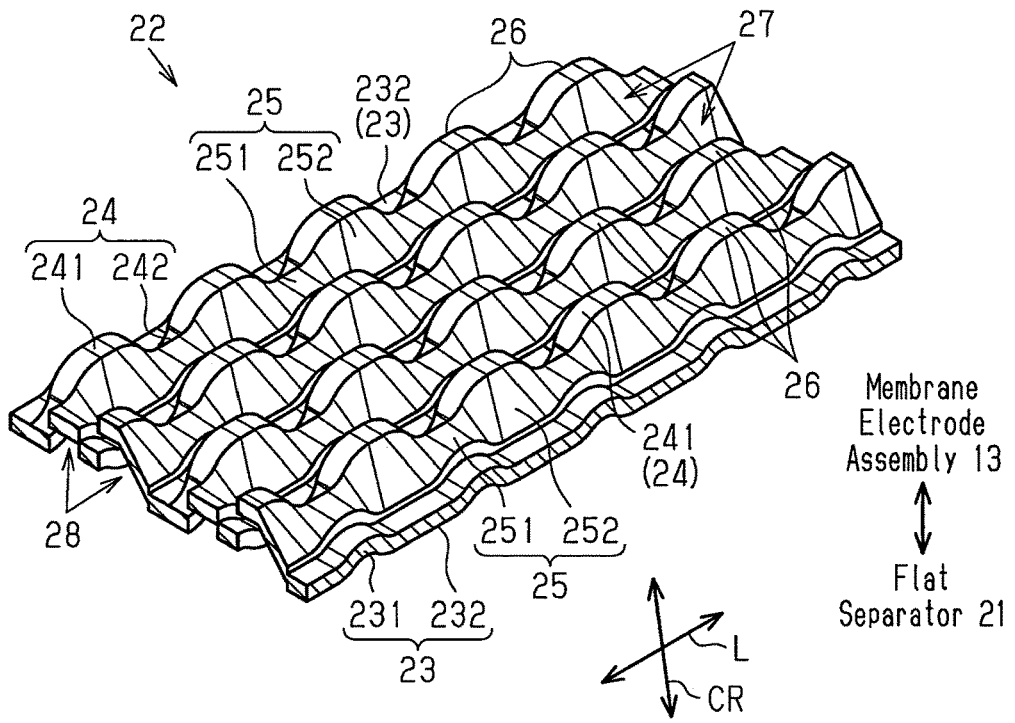
FIG. 4A is a perspective view of the gas flow passage formation plate taken from a diagonally upper side.
Figure 4B:
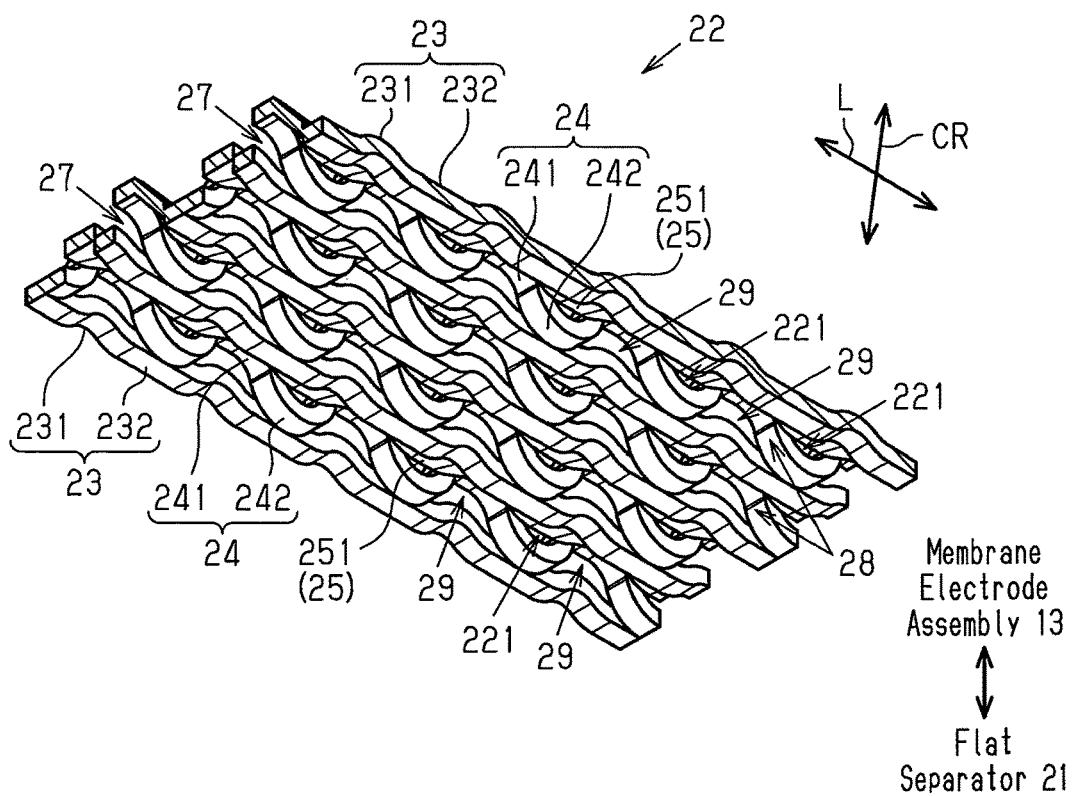
FIG. 4B is a perspective view of the gas flow passage formation plate taken from a diagonally lower side.

As shown in FIG. 4A, at a location at which the projected part 231 of the small wave portion 23 or the steeply inclined part 252 of the middle wave portion 25 is arranged in the gas flow passage 27, part of an interior wall of the gas flow passage 27 is inclined so as to approach the membrane electrode assembly 13 as the recessed part 232 of the small wave portion 23 becomes farther away. Accordingly, some of the oxidant gas flowing in the gas flow passage 27 flows along such inclined parts of the interior wall in the gas flow passage 27 toward the membrane electrode assembly 13 and flows into the gas diffusion layer 17 (refer to FIG. 1).

A location at which the projected part 231 of the small wave portion 23 or the gradually inclined part 251 of the middle wave portion 25 is arranged in the gas flow passage 27 is projected farther toward the membrane electrode assembly 13 than a location at which the recessed part 232 of the small wave portion 23 is arranged in the gas flow passage 27. Accordingly, the projected part 231 of the small wave portion 23 or the gradually inclined part 251 of the middle wave portion 25 locally narrows the cross-sectional area of the gas flow passage 27. Thus, the interior pressure of the gas flow passage 27 is higher at such a part than at other parts of the gas flow passage 27 (more specifically, a location at which recessed part 232 of small wave portion 23 is arranged).

In this manner, in the gas flow passage 27, a pressure difference is generated between opposite sides of each projection 26, that is, between a side of the large wave portion 24 of the projection 26 at which the projected part 231 of the small wave portion 23 is arranged and a side of the steeply inclined part 252 of the projection 26 at which the recessed part 232 of the small wave portion 23 is arranged. The pressure difference directs some of the oxidant gas flowing in the gas flow passage 27 to flow from the side of the projection 26 at which the large wave portion 24 is arranged toward the side at which the steeply inclined part 252 is arranged so as to flow over the projection 26. In this way, some of the oxidant gas flows in the direction that is orthogonal to the extension direction L. In addition, a pressure difference is generated in the gas flow passage 27 in the direction orthogonal to the extension direction L between opposite sides of a part sandwiched by projections 26 that are adjacent to each other in the extension direction L. That is, a pressure difference is generated in the gas flow passage 27 between the location at which the projected part 231 of the small wave portion 23 is arranged and the location at which the recessed part 232 of the small wave portion 23 is arranged. The pressure difference directs some of the oxidant gas flowing in the gas flow passage 27 to flow through the region between adjacent projections 26 arranged in the extension direction L. Accordingly, some of the oxidant gas flows in the direction orthogonal to the extension direction L.

In the present embodiment, the oxidant gas is diffused in the gas flow passage 27 in this way. Some of the oxidant gas flowing in the gas flow passage 27 in the direction orthogonal to the extension direction L flows along the side wall of each projection 26 toward the membrane electrode assembly 13 and into the gas diffusion layer 17.

In this manner, the use of the gas flow passage formation plate 22 allows the oxidant gas to be easily supplied to the membrane electrode assembly 13. This improves the power generation efficiency of the fuel cell.

As shown in FIGS. 2B, 2C, 3B, and 4B, the side of the gas flow passage formation plate 22 opposing the flat separator 21 includes the groove-like water flow passage 28 formed between two adjacent small wave portions 23. More specifically, the water flow passage 28 is defined (including inside of projections 26) by side walls of adjacent small wave portions 23 and the parts that connect the adjacent small wave portions 23 (large wave portions 24 and middle wave portions 25). The water flow passage 28 mainly functions as a passage that discharges the water produced in the membrane electrode assembly 13 during power generation.

Figure 3A:
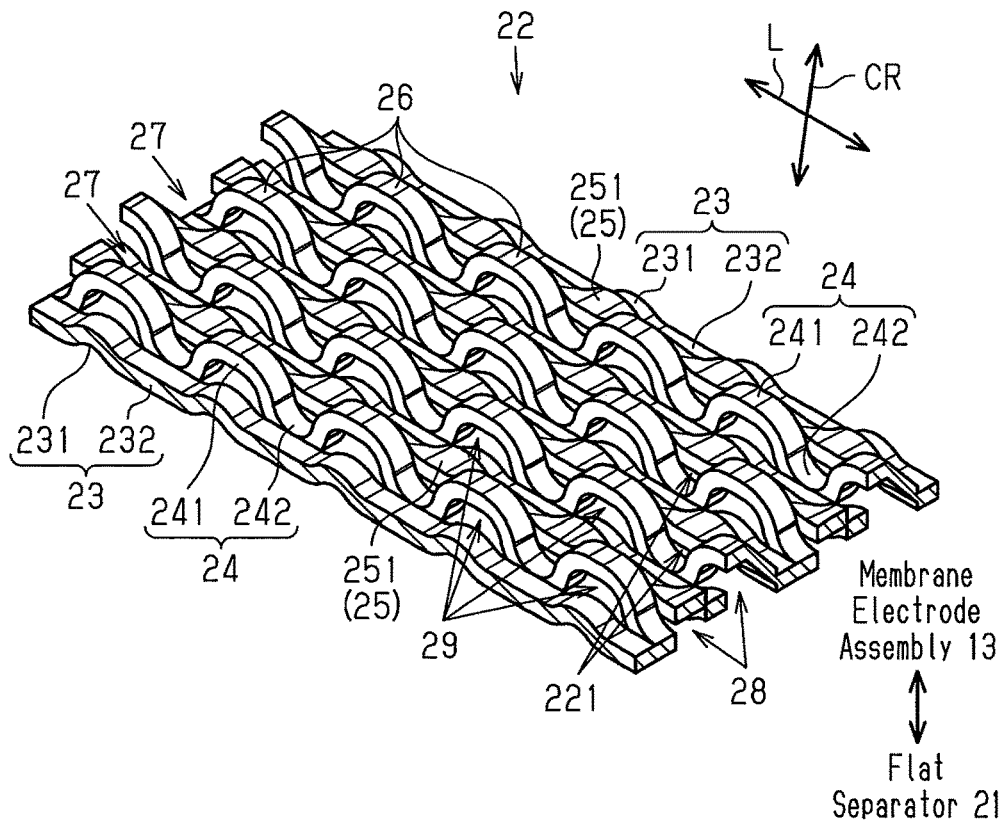
FIG. 3A is a perspective view of the gas flow passage formation plate taken from a diagonally upper side.
Figure 3B:
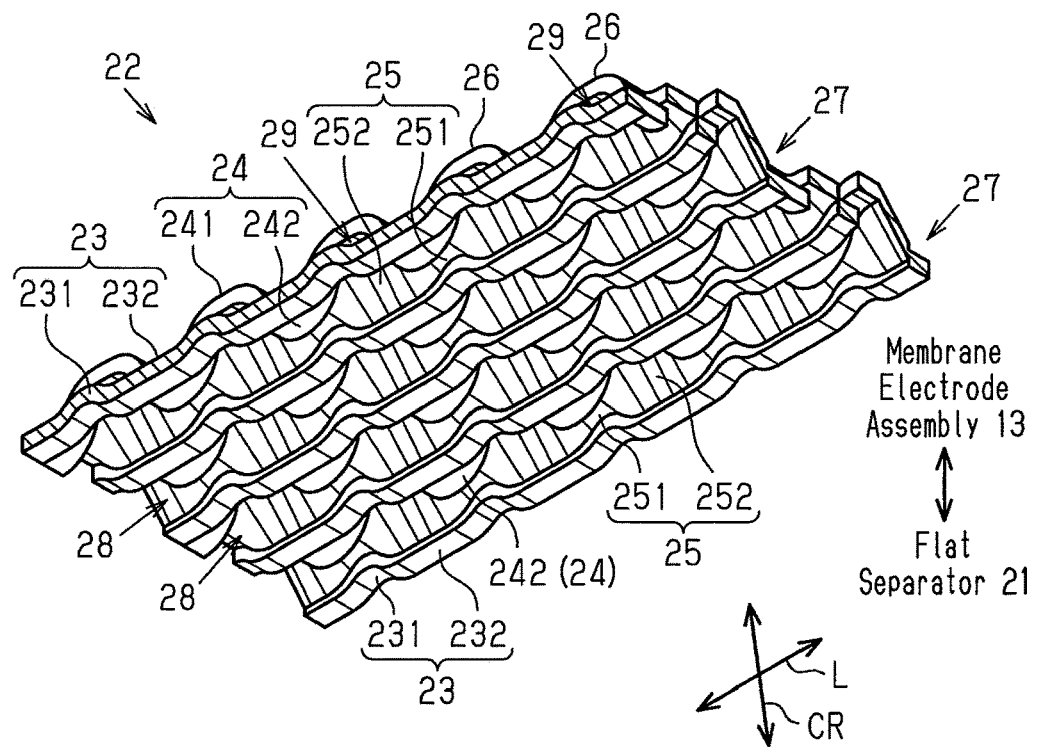
FIG. 3B is a perspective view of the gas flow passage formation plate taken from a diagonally lower side.

As shown in FIGS. 3A and 3B, at the boundary between the small wave portion 23 and the large wave portion 24, a space is formed between each projected part 231 of the small wave portion 23 and the corresponding projected part 241 of the large wave portion 24. The space functions as a through hole (opening 29) that connects the inside of the projection 26 (water flow passage 28) and the outside of the projection 26 (gas flow passage 27). The opening 29 forms a single through hole, and is arranged in the side wall of each projection 26. The projections 26 all include a single opening 29. The openings 29 all open in the same direction (diagonally lower left side as viewed in FIG. 3A).

At the boundary of the large wave portion 24 and the middle wave portion 25 of the gas flow passage formation plate 22, a space is formed between each recessed part 242 of the large wave portion 24 and the corresponding gradually inclined part 251 of the middle wave portion 25. The space functions as a through hole (opening 221) that connects the side of the gas flow passage formation plate 22 opposing the flat separator 21 (water flow passage 28) and the side of the gas flow passage formation plate 22 opposing the membrane electrode assembly 13 (gas flow passage 27).

The openings 29 and 221 function as passages that discharge the water produced in the cell 10 to the water flow passage 28.

As shown in the lower cell 10 of FIG. 1, when fuel gas is supplied into the gas flow passage 37 through the supply passage 51, the fuel gas flows through the gas flow passage 37 into the gas diffusion layer 18. The fuel gas diffuses through the gas diffusion layer 18 and is supplied to the electrode catalyst layer 16. Further, when oxidant gas is supplied into the gas flow passage 27 through the supply passage 41, the oxidant gas flows through the gas flow passage 27 into the gas diffusion layer 17. The oxidant gas diffuses through the gas diffusion layer 17 and is supplied to the electrode catalyst layer 15. In this manner, fuel gas and oxidant gas are supplied to the membrane electrode assembly 13 to generate power in the membrane electrode assembly 13 by electrochemical reaction. During the power generation in the membrane electrode assembly 13, water is produced in the gas diffusion layer 17 (more specifically, on and near interface to electrode catalyst layer 15) at the cathode side.

As shown in FIGS. 2C, 3A, and 3B, the water flows into the gas flow passage 27 of the gas flow passage formation plate 22 and is drawn by capillary action into the water flow passage 28 through the openings 29 and 221. When the water drawn into the water flow passage 28 forms droplets and collects near the openings 29 and 221, the collected water functions as a priming water. In this way, the water flowing in the openings 29 and 221 is drawn by capillary action into the water flow passage 28.

The water drawn into the water flow passage 28 is forced toward a downstream side (left side as viewed in FIG. 1) by the flow pressure of the oxidant gas flowing in the water flow passage 28 and discharged out of the cell 10 through the discharge passage 42 (refer to FIG. 1).

The operation of the gas flow passage formation plate 22 applied in the cell 10 will now be described.

Figure 5A:
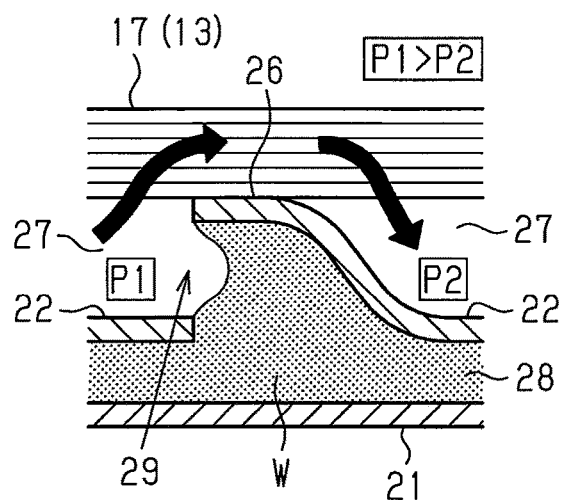
FIG. 5A is a schematic cross-sectional view showing a cell of the embodiment.

As shown in FIG. 5A, the cell of the present embodiment is configured so that a pressure difference (P1>P2) is generated at opposite sides of each projection 26 in the gas flow passage 27. Accordingly, some of the oxidant gas in the gas flow passage 27 flows toward the tip of the projection 26 from one side (left side as viewed in FIG. 5A) of the projection 26 to the other side (right side as viewed in FIG. 5A) of the projection 26. This diffuses the oxidant gas in the gas flow passage 27 toward the membrane electrode assembly 13.

Figure 5B:
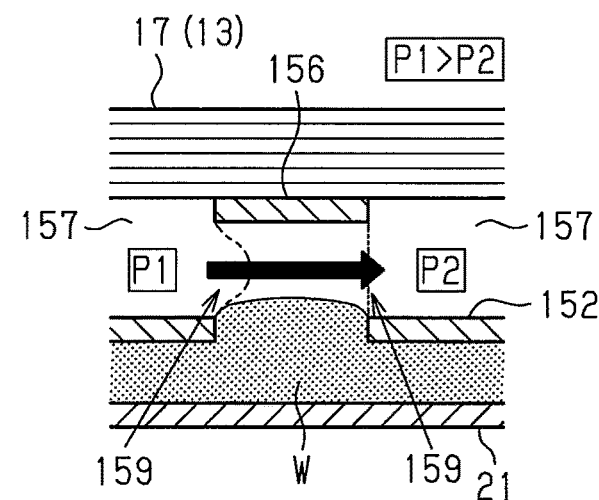
FIG. 5B is a schematic cross-sectional view showing a cell of a comparative example.

FIG. 5B is a schematic cross-sectional view showing a cell of a comparative example. As shown in FIG. 5B, in the cell of the comparative example, two openings 159 are located at opposite sides of the tip of a projection 156 of a gas flow passage formation plate 152. Accordingly, even when there is a pressure difference (P1>P2) between two sides of the projection 156, as shown by the bolded arrow in FIG. 5B, oxidant gas flowing in the gas flow passage 157 would not flow toward the tip of the projection 156 but would flow into the inside of the projection 156 through the openings 159. In the cell of the comparative example, as shown by the double-dashed line in FIG. 5B, even when water W forms droplets and collects in the projection 156, the pressure difference causes the oxidant gas to flow through and out of the projection 156 while forcing away water W. In such a case, the oxidant gas would not be sufficiently diffused toward the membrane electrode assembly 13. Consequently, the power generation efficiency of the fuel cell stack cannot be improved.

In this regard, in the present embodiment, each projection 26 includes only one opening 29. Thus, as shown in FIG. 5A, the inside of the projection 26 and the opening 29 do not form a passage that connects two sides of the projection 26. Accordingly, when the pressure difference (P1>P2) is generated between two sides of the projection 26 in the gas flow passage 27, as shown by the bolded arrows in FIG. 5A, some of the oxidant gas in the gas flow passage 27 flows toward the tip of the projection 26 from one side of the projection 26 to the other side of the projection 26. This sufficiently diffuses the oxidant gas in the gas flow passage 27.

In the present embodiment, as shown in FIGS. 3A and 3B, each of the projections 26 includes the opening 29. This allows the openings 29, which function as passages discharging water from the gas flow passage 27 to the water flow passage 28, to be thoroughly arranged over the entire gas flow passage formation plate 22. Accordingly, the side of the gas flow passage formation plate 22 opposing the flat separator 21 (water flow passage 28) functions as a water flow passage having a wide range for water to flow over. This improves the water discharge performance of the cell 10 including the gas flow passage formation plate 22.

In the present embodiment, the projections 26 are arranged at equal intervals on the gas flow passage formation plate 22. Further, the openings 29 all open in the same direction. This allows for the projections 26 including the openings 29 and having the same form to be arranged over the entire gas flow passage formation plate 22. Accordingly, the diffusion of oxidant gas in the gas flow passage 27 and the discharge of water to the water flow passage 28 are performed in a well-balanced manner over the entire gas flow passage formation plate 22.

In the present embodiment, the anode side of the gas flow passage formation plate 32 has the same structure as the cathode side of the gas flow passage formation plate 22. Thus, the projections 36 and the openings 39 of the gas flow passage formation plate 32 at the anode side operate in the same manner as the projections 26 and the openings 29 of the gas flow passage formation plate 22 at the cathode side as described above.

The above embodiment has the advantages described below.

(1) The projection 26 each includes only one opening 29. Further, the projection 36 each includes only one opening 39. Thus, gas (fuel gas or oxidant gas) can sufficiently be diffused in the gas flow passages 27 and 37.

(2) Each of the projections 26 includes the opening 29. Further, each of the projections 36 includes the opening 39. This improves the discharge performance of the cell 10 including the gas flow passage formation plates 22 and 32.

(3) The openings 29 and 39 all open in the same direction. Thus, the diffusion of gas in the gas flow passages 27 and 37 and the discharge of water to the water flow passages 28 and 38 are performed in a well-balanced manner over the entire gas flow passage formation plates 22 and 32.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

The arrangement of the projections 26 on the gas flow passage formation plate 22 and the arrangement of the projections 36 on the gas flow passage formation plate 32 may be modified.

The direction toward which the openings 29 and 39 open may be changed. Specific examples of modified gas flow passage formation plates including openings that open in other directions will now be described.

Figure 6:
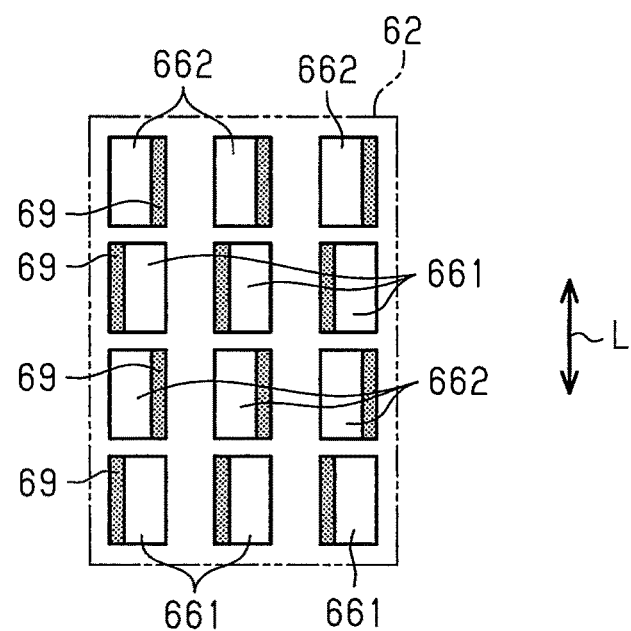
FIG. 6 is a schematic plan view showing the gas flow passage formation plate of a modified example.

FIG. 6 shows a gas flow passage formation plate 62 that includes projections 661 and projections 662 alternately arranged in a serpentine manner in an extension direction L. The projections 661 and 662 each include an opening 69. Each projection 661 has a side wall located toward one side (left side as viewed in FIG. 6) of the gas flow passage formation plate 62 that includes the opening 69. Each projection 662 has a side wall located toward the other side (right side as viewed on FIG. 6) of the gas flow passage formation plate 62 that includes the opening 69. The projections 661 including the openings 69 in the walls located toward the same side are aligned in the direction orthogonal to the extension direction L (orthogonal direction). In the same manner, the projections 662 including the openings 69 in the walls located toward the same side are aligned in the direction orthogonal to the extension direction L.

Figure 7:
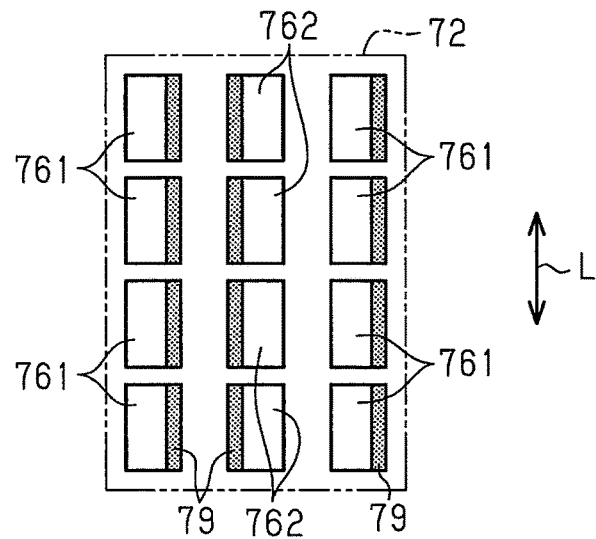
FIG. 7 is a schematic plan view showing the gas flow passage formation plate of a modified example.

FIG. 7 shows a gas flow passage formation plate 72 including projections 761 arranged in the extension direction L and projections 762 arranged in the extension direction L. The projections 761 and 762 each include an opening 79. The openings 79 of the projections 761 are arranged on the same side of the projections 761, and the openings 79 of the projections 762 are arranged on the same side of the projections 762. The projections 761 and the projections 762 are alternately arranged in the orthogonal direction on the gas flow passage formation plate 72. The openings 79 of the projections 761 are arranged in the side walls located toward one side (right side as viewed in FIG. 7) of the gas flow passage formation plate 72. The openings 79 of the projections 762 are arranged in the side walls located toward the other side (left side as viewed in FIG. 7) of the gas flow passage formation plate 72.

Figure 8:
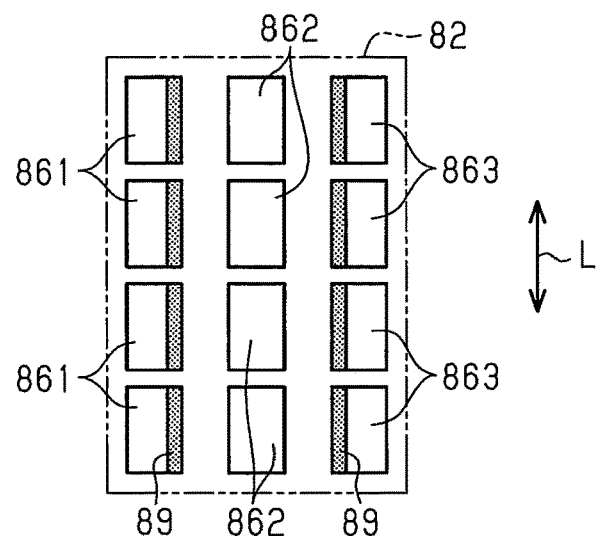
FIG. 8 is a schematic plan view showing the gas flow passage formation plate of a modified example.

FIG. 8 shows a gas flow passage formation plate 82 including projections 861 with openings 89 in the side walls located toward one side (right side as viewed in FIG. 8) of the gas flow passage formation plate 82. The projections 861 are arranged in the extension direction L and form the leftmost row in the orthogonal direction. A row second from the leftmost row in the orthogonal direction is formed by projections 862 that do not include the openings 89. A row third from the leftmost row in the orthogonal direction includes projections 863 with the openings 89 in the side walls located toward the other side (left side as viewed in FIG. 8) of the gas flow passage formation plate 82. As shown by the example of FIG. 8, all of the projections do not necessarily have to include the openings.

Figure 9:
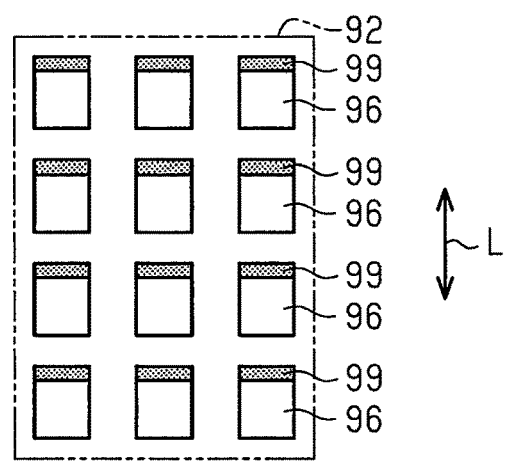
FIG. 9 is a schematic plan view showing the gas flow passage formation plate of a modified example.

FIG. 9 shows a gas flow passage formation plate 92 including projections 96 with openings 99 in walls located toward one side (upper side as viewed in FIG. 9) in the extension direction L.

Figure 10:
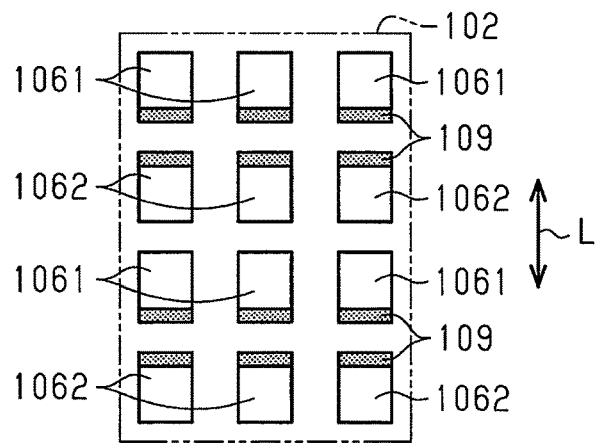
FIG. 10 is a schematic plan view showing the gas flow passage formation plate of a modified example.

FIG. 10 shows a gas flow passage formation plate 102 including projections 1061 and projections 1062 alternately arranged in the extension direction L. The projections 1061 each include an opening 109 in a wall located toward one side (lower side as viewed in FIG. 10) of the gas flow passage formation plate 102 in the extension direction L. The projections 1062 each include the opening 109 in a wall located toward the other side (upper side as viewed in FIG. 10) of the gas flow passage formation plate 102 in the extension direction L. The projections 1061 are aligned in the orthogonal direction. The openings 109 of the projections 1061 are arranged in the walls located toward the same side of the gas flow passage formation plate 102. Further, the projections 1062 are aligned in the orthogonal direction. The openings 109 of the projections 1062 are arranged in the walls located toward the same side of the gas flow passage formation plate 102.

Figure 11:
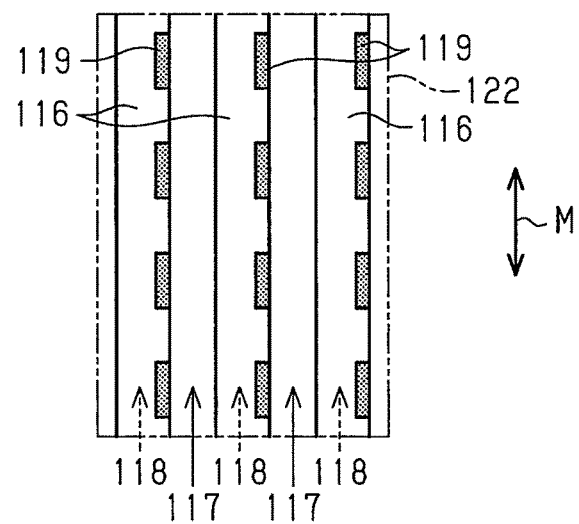
FIG. 11 is a schematic plan view showing the gas flow passage formation plate of a modified example.
Figure 12:
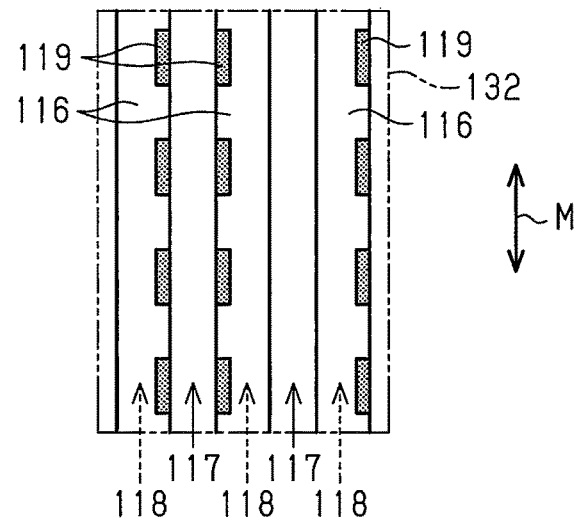
FIG. 12 is a schematic plan view showing the gas flow passage formation plate of a modified example.

As schematically shown in FIGS. 11 and 12, the membrane electrode assembly 13 (refer to FIG. 1) and the flat separator 21 or 31 may sandwich a gas flow passage formation plate that include a plurality of protrusions 116 projecting toward the membrane electrode assembly 13 (upward from plane of FIGS. 11 and 12) and arranged at intervals. In the gas flow passage formation plate, the portion of the gas flow passage formation plate at the side opposing the membrane electrode assembly 13 including regions between two adjacent protrusions 116 functions as a gas flow passage 117. Further, the portion of the gas flow passage formation plate at the side opposing the flat separator (downward from plane of FIG. 11) including the inside of the protrusions 116 functions as a water flow passage 118. More specifically, the gas flow passage 117 includes groove-like portions formed between two adjacent protrusions 116. The gas flow passage 117 mainly functions as a passage that circulates gas (fuel gas or oxidant gas). The water flow passage 118 includes groove-like portions formed inside the protrusions 116. The water flow passage 118 mainly functions as a passage that discharges the water produced during power generation in the membrane electrode assembly 13. The gas flow passage formation plate is a curved in a wave-shaped manner in a direction orthogonal (orthogonal direction) to a direction in which the protrusions 116 extend, that is, a direction in which the gas flow passage 117 extends (extension direction M). The gas flow passage formation plate includes a plurality of openings 119 that are formed in a side wall of each protrusion 116. The opening 119 connects the inside of the protrusion 116 (water flow passage 118) and the outside of the protrusion 116 (gas flow passage 117). The plurality of openings 119 are separated from each other in the extension direction M of the protrusions 116.

The gas flow passage formation plate 122 shown in FIG. 11 includes the protrusions 116 with the openings 119. The openings 119 of all of the protrusions 116 are arranged only in one of the side walls (right side wall as viewed in FIG. 11) in the extension direction M.

The gas flow passage formation plate 132 shown in FIG. 12 includes the protrusions 116 with the openings 119 arranged only in the walls located toward one side (right side as viewed in FIG. 12) of the gas flow passage formation plate 132 in the extension direction M and the protrusions 116 with the openings 119 arranged only in the other wall (left side as viewed in FIG. 12) of the gas flow passage formation plate 132. The protrusions 116 with openings 119 located on the right side and the protrusions 116 with openings 119 located on the left side are alternately arranged.

With such a gas flow passage formation plate, the openings 119 are not formed in both side walls of the protrusion 116 sandwiching the tip of the protrusion 116 in the orthogonal direction. Accordingly, when a pressure difference is generated between the two sides of the protrusion 116, the pressure difference would not allow the gas to flow through the inside of the protrusion 116. Thus, when a pressure difference is generated between two sides of the protrusion 116 in the gas flow passage 117, some of the gas in the gas flow passage 117 flows toward the tip of the protrusion 116 (toward membrane electrode assembly 13) from one side of the protrusion 116 to the other side. This sufficiently diffuses gas (oxidant gas or fuel gas) in the gas flow passage 117.

The openings 119 may be formed in both side walls of the protrusion 116. In this case, the openings 119 formed in one side wall of one protrusion 116 are offset from the openings 119 formed in the other side wall in the extension direction M so as not to be aligned in the orthogonal direction.

With such a gas flow passage formation plate, the openings 119 are formed in both side walls of the protrusion 116. However, the openings 119 in one side wall do not overlap the openings 119 in the other side wall in the orthogonal direction. Accordingly, when a pressure difference is generated between two sides of the protrusion 116, gas is less likely to flow through the inside of the protrusion 116 compared to the structure in which the openings 119 formed in one side wall of the protrusion 116 and the openings 119 formed in the other side wall are aligned in the orthogonal direction. Thus, when a pressure difference is generated between two sides of the protrusion 116 in the gas flow passage 117, some of the gas in the gas flow passage 117 flows toward the tip of the protrusion 116 (toward membrane electrode assembly 13) from one side of the protrusion 116 to the other side.

All of the protrusions 116 do not necessarily have to include the openings 119. That is, some of the protrusions 116 do not necessarily have to include the openings 119.

The opening arranged in the projection (or protrusion) of the gas flow passage formation plate does not necessarily have to be a single through hole. That is, the opening may include a plurality of openings. Specifically, openings that form a meshed structure, openings that form the structure of a perforated metal, or an opening that is divided into a plurality of openings by wall-like (or column-like) components may be used.

The structure of the gas flow passage formation plate in the above embodiment does not necessarily have to be applied over the entire gas flow passage formation plate. That is, the structure of the gas flow passage formation plate in the above embodiment may only be applied to part of the gas flow passage formation plate. Application of the structure of the gas flow passage formation plate in the above embodiment to portions of a cell at which the gas diffusion performance is likely to be lower allows for sufficient gas diffusion in the gas flow passage.

Instead of the flat separators 21 and 31 having the form of a flat plate, any partition plate may be used, such as a partition plate that includes recesses and projections (dimples and bumps) or a wave-shaped partition plate.

The invention claimed is:

1. A gas flow passage formation plate for a fuel cell, wherein the gas flow passage formation plate is located between a membrane electrode assembly and a partition plate and is included in a separator of a cell in a fuel cell, the gas flow passage formation plate comprising:

a plurality of projections that project toward the membrane electrode assembly, wherein the projections are arranged in a first direction and a second direction that is orthogonal to the first direction;

a gas flow passage formed by a portion of the gas flow passage formation plate at a side opposing the membrane electrode assembly and including regions between all adjacent ones of the projections;

a water flow passage formed by a portion of the gas flow passage formation plate at a side opposing the partition plate and including an inside of each of the projections; and a plurality of openings, each formed in a side wall of a corresponding one of the projections and connecting the inside and an outside of the corresponding projection, wherein each of the openings is arranged at only one location in the corresponding one of the projections, wherein each of the projections includes a first side having the opening and a second side opposite to the first side, the second side devoid of openings, wherein a first cross-sectional area of the gas flow passage that is orthogonal to a gas flow direction of the gas flow passage and located directly to the first side of each of the projections is less than a second cross-sectional area of the gas flow passage that is orthogonal to the gas flow direction and located directly to the second side of each of the projections.

2. The gas flow passage formation plate according to claim 1, wherein the projections are arranged at equal intervals and the openings all open in the same direction.

3. A gas flow passage formation plate for a fuel cell, wherein the gas flow passage formation plate is located between a membrane electrode assembly and a partition plate and is included in a separator of a cell in a fuel cell, the gas flow passage formation plate comprising:

a plurality of protrusions that project toward the membrane electrode assembly and extend in a first direction, wherein the protrusions are arranged at intervals in a second direction intersecting the first direction;

a gas flow passage formed by a portion of the gas flow passage formation plate at a side opposing the membrane electrode assembly and including regions between adjacent ones of the protrusions;

a water flow passage formed by a portion of the gas flow passage formation plate at a side opposing the partition plate and including an inside of each of the protrusions; and a plurality of openings formed in a first side wall of each of the protrusions and connecting the inside and an outside of each of the protrusions, wherein the plurality of openings of each of the protrusions are separated from each other in the first direction by portions of the first side wall that separate adjacent ones of the plurality of openings from each other.

4. The gas flow passage formation plate according to claim 3, wherein each of the protrusions further includes a second side wall opposing the first side wall, the first side walls of the protrusions face a common direction, and the plurality of openings of each of the protrusions are formed only in the first side walls and not the second side walls of the protrusions.

5. A fuel cell stack, comprising:

a stack of cells, wherein each of the cells includes a membrane electrode assembly and a pair of separators that sandwich the membrane electrode assembly, and at least one of the two separators includes a partition plate and the gas flow passage formation plate according to claim 1 that is located between the partition plate and the membrane electrode assembly.

6. A fuel cell stack, comprising:

a stack of cells, wherein each of the cells includes a membrane electrode assembly and a pair of separators that sandwich the membrane electrode assembly, and at least one of the two separators includes a partition plate and the gas flow passage formation plate according to claim 3 that is located between the partition plate and the membrane electrode assembly.

* * * * *